United States Patent Office 2,890,996
Patented June 16, 1959

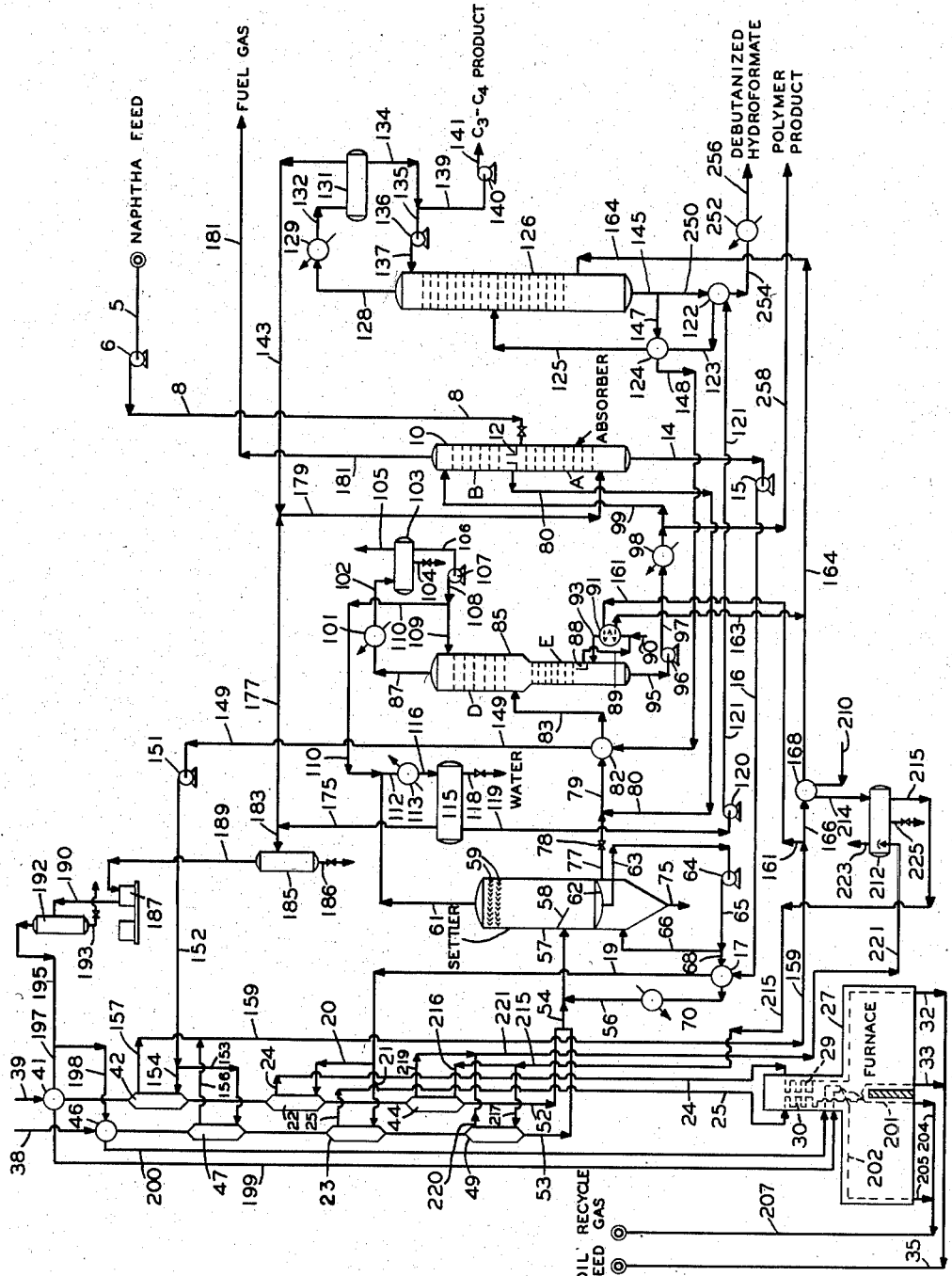

2,890,996

HYDROCARBON CONVERSION PROCESS

Nicholas J. G. Alozery, New York, N.Y., and George W. Stanford, Linden, N.J., assignors to The M. W. Kellogg Company, Jersey City, N.J., a corporation of Delaware Application December 28, 1953, Serial No. 400,585

17 Claims. (Cl. 208—84)

This invention relates to an improved method of recovering finely divided solids from a gasiform or vapor material, and more particularly, it pertains to a method of recovering entrained finely divided solid reforming catalyst from a gasiform reformed product, and also, recovering valuable gasoline components from higher boiling liquid product and normally gaseous product material.

In the present day commercial design of fluid hydroformers, the catalyst fines which are entrained in the gaseous reaction products are recovered by passing the same into a scrubbing tower wherein a high boiling liquid product fraction, commonly known as the polymer, is contacted with the upflowing gaseous product material in countercurrent fashion, thus removing catalyst fines and condensing a portion of the product material from the upflowing gaseous reaction product material. In the use of this technique, it is found necessary to design a scrubbing tower of fairly large proportions in order to accommodate the quantity of material being processed. Further, it is found that the recovery of catalyst fines is not as satisfactory or effective as desired. Also, in this design, gasoline contained in the normally gaseous product is separated and recovered by absorption in the liquid feed material. One of the serious disadvantages of this absorption step is the significant loss of liquid feed through vaporization into the normally gaseous product material. In the scrubbing step of the process, some gasoline is liquefied with the polymer product by partial condensation of the total vaporous product. The condensed gasoline may be later recovered by stripping the polymer fraction with normally gaseous product material under reduced pressure. While this technique is effective in separating the gasoline from the polymer, it has the disadvantage of requiring an additional separation of gasoline from the normally gaseous product material, which separation may be accomplished by passing the enriched gaseous product into the absorption zone wherein the liquid feed is used as the absorbing medium. This method of recovering the stripped gasoline from the gasiform stripping agent results in a loss of liquid feed material through vaporization without mentioning the effect on absorption tower design. After careful investigation, we have discovered methods of effecting the above method of operation with a substantial reduction in cost of equipment and with significantly reduced loss of feed material.

It is an object of this invention to provide an improved method of separating entrained finely divided solids from a gaseous material.

Another object of this invention is to provide an improved method for recovering entrained finely divided catalytic material from a gasiform reaction product in a hydrocarbon conversion process.

Still another object of this invention is to provide an improved method for the recovery of entrained finely divided reforming catalytic material from a gaseous reaction product in a fluid hydroforming system.

A further object of this invention is to provide a method for recovering finely divided reforming catalytic material which is entrained in a gasiform reaction product of a hydroforming system, and also, to provide a method of separating gasoline from the normally gaseous product and from the polymer product in an effective and economical manner.

Other objects and advantages will become apparent from the following explanation and description thereof.

By means of this invention, it is contemplated separating and recovering finely divided solids which are entrained in a gaseous material, including condensable high boiling compounds, by the method which comprises combining said gaseous material with a high boiling quench liquid in a quenching zone whereby a substantial amount of the high boiling normally liquid material is condensed and substantially all of the finely divided solids is wetted, passing the total material from the quenching zone to a separating zone wherein the uncondensed gaseous material is separated from the liquid material containing substantially all of the finely divided solids, withdrawing a portion of the liquid material from the separating zone for use as the high boiling quench liquid, and withdrawing the remaining portion of the liquid material from the separating zone and passing the same to a settling zone wherein the liquid material containing solids is allowed to separate into a supernatant liquid and a liquid slurry of solids.

The present invention is particularly applicable to a fluid hydroforming process by reason that in such a process a polymer material is produced which can be used as the quench liquid. However, in fluid hydroforming it may also be necessary to separate and recover valuable gasoline components from the normally gaseous material and the polymer. The condensation of polymer from the total reaction product by quenching effects a crude separation, hence, part of the gasoline product is condensed with the polymer. In one aspect of this invention, the gasoline compounds are separated and recovered from the polymer by heating with or without the presence of a gasiform agent under reduced pressure, however, in the preferred operation, these gasoline components are recovered by heating and stripping the polymer with a condensable stripping agent such as, for example, steam, in order that the ultimate separation of gasoline from the stripping agent can be effected by cooling to condense the stripping agent and decantation. In a second cooling step, the remaining condensable liquid material which is the gasoline, is separated by condensation, thus leaving a raw normally gaseous product containing a small amount of gasoline. The raw normally gaseous product is subjected to an absorption treatment by contact with the liquid feed normally charged to the conversion process whereby gasoline components are preferentially absorbed into the liquid feed material. Under the conditions usually employed in this absorption step, it is found that a significant quantity of liquid feed is vaporized into the normally gaseous product material, and since this can be a serious economic loss, it is desirable to conduct an additional treatment to recover the vaporized feed. To prevent excessive loss of feed, it is contemplated by means of this invention to contact additionally the normally gaseous product material with a portion of the stripped polymer in order to recover by absorption any feed material which has been vaporized into the normally gaseous product material and insure complete absorption of the gasoline therefrom.

By comparison with other known methods, the present invention has many advantages, particularly in the field of fluid hydroforming. In the first instance, the use of a quench liquid for the purpose of condensing substantially all of the polymer and wetting the entrained finely divided solids in a quenching zone permits the use of a substantially smaller tower for separating solids and polymer from the total reaction product. In a prior art method, the scrubbing tower contains internal baffles over which polymer cascades downwardly in countercurrent contact with the upflowing gaseous reaction product. In the upper portion of the tower there is a fractionating section where substantially complete separation of polymer from the lighter boiling product materials is effected. In order to effect fractionation in this tower, it is necessary to introduce the gaseous reaction product at a significantly higher temperature level than is used in the present invention. As a result, the heat content of the gaseous reaction product cannot be recovered for economic use, for example, in the generation of steam, and it represents a loss in the process. Further, the quantity of normally gaseous product material which is present in the reaction product material does not permit satisfactory fractionation to be effected in the previous scrubbing-fractionation tower design. Furthermore, by reason of the substantially lower temperature at which the mixture is introduced into the separating and settling tower of the present invention, this tower is of a substantially smaller size than the tower which combines scrubbing and fractionation. Further, the gaseous reaction product is cooled to a significantly lower level in the present invention prior to being quenched with the high boiling liquid material. The heat removed in cooling of the reaction product can be used economically for various purposes such as, for example, in the generation of steam, etc. The steam generated in this way can be used for stripping the polymer product to separate therefrom gasoline components. A condensable gaseous material is preferred as a stripping agent, because it lends itself to easy separation of stripped products from the stripping agent by the simple procedure of cooling. The use of the normally gaseous product material as the stripping agent is not as desirable as steam, because the enriched gaseous product would be charged to the absorption zone wherein liquid feed is employed as the absorbing medium for the recovery of gasoline components from the normally gaseous product material, hence, increasing the capacity of the absorption tower. Further, the larger the quantity of normally gaseous product material which is subjected to the absorption treatment relative to feed material, the greater the loss of feed material through vaporization. Hence, it is advantageous in the present invention to utilize steam as the stripping medium in the recovery of gasoline components from the polymer.

As previously indicated, the present invention is applicable to any system in which a gasiform material containing entrained finely divided solid material is present, and it is desired to recover the entrained solids from the gaseous material. This situation occurs frequently in fluid hydrocarbon conversion processes such as, for example, cracking under hydrogen pressure, catalytic cracking, desulfurization, hydrogenation, dehydrogenation, etc. While the present method can be used in these various processes, it finds special application in fluid hydroforming. In fluid hydroforming, the reaction product is comprised of three materials, namely, a normally gaseous product, a gasoline and polymer. The gasoline product is normally a liquid which has an initial boiling point in the range of about 85° to about 175° F. and an end point which varies from about 350° to about 450° F. The polymer is normally liquid and of a higher boiling range than the gasoline, hence, the initial boiling point varies with the end point of the gasoline. The polymer contains a high concentration of aromatics of a highly refractive nature, hence, this product serves unusually well as a vehicle for recycle of recovered catalyst fines to the reforming zone. Another purpose of the polymer is to quench the gaseous reformed product containing the entrained catalyst fines. For this purpose, the polymer can be used many times without danger of decomposing the same and causing contamination of the gasoline. The properties of the polymer are especially adapted for absorbing any vaporized feed material contained in the normally gaseous product resulting from the use of the feed material to absorb gasoline from the normally gaseous product. Hence, it is to be noted that the polymer produced in a fluid hydroforming process serves the threefold purpose of (1) acting as a vehicle for recovered catalyst fines to be recycled to the reforming zone; (2) a quench liquid for the gasiform reformed product for the purpose of wetting the entrained catalyst fines and condensing substantially all of the vaporous polymer product contained therein; and (3) it serves as an absorbing medium for vaporized feed material contained in the normally gaseous product.

In the practice of the present invention, the quench liquid can be any liquid which does not decompose or react significantly with the gasiform and/or finely divided solids. It should be preferably a liquid which boils at least in the range of the heaviest part of the condensible fraction of the gasiform material, when it is present, or if the gasiform material is normally a gas, it can be any liquid meeting the requirements listed above. In the case of fluid hydroforming, the polymer product is used as quench liquid, consequently, the boiling characteristics are those given above for the description of the polymer. In the use of the quench liquid, the temperature can vary considerably depending upon whether the gasiform material contains condensible components, and upon the extent to which it is desired to effect partial condensation. When the gasiform material is comprised only of normally gaseous components, under some conditions ambient temperatures for the quench liquid are permissible, or a superatmospheric temperature depending on the temperature of the gasiform material such that sufficient quench liquid remains unvaporized to wet the finely divided solids. For hydrocarbon conversion processes, generally, or, for example, fluid hydroforming, the quench liquid is used at a temperature of about 150° to about 450° F., more usually, about 230° to about 325° F. The volumetric quantity of quench liquid employed relative to the volume of gasiform material carrying finely divided solids can be, generally, about .001 to 1.0 barrel of quench liquid (1 barrel equals 42 gallons) per 1000 standard cubic feet of gasiform material.

An important feature of this invention resides in contacting the quench liquid with gasiform material in a transfer zone of such cross-sectional area that a high linear flow rate is maintained. The quench liquid and gasiform material are in concurrent relation with each other and this insures better mixing and consequent wetting of the catalyst. For example, in the process as heretofore practiced the quench liquid was contacted with gasiform material at linear flow rates of about 1 to 5 feet per second, and it was found that at these flow rates, there was not enough turbulence created to wet effectively and quickly the entrained finely divided solids. By means of this invention, this disadvantage is overcome substantially by maintaining a linear flow rate in the range of about 30 to 500 feet per second, more usually, about 60 to 150 feet per second. A high linear flow rate is highly desirable, because it creates a turbulent condition which promotes wetting of the finely divided solid material. Once the solids are wetted they readily settle into the liquid and form a slurry. Hence, for the purposes of this invention, it is preferred to maintain a high linear flow rate in a transfer zone, and this condition can be promoted by a high ratio of quenching liquid to gaseous material and/or a restricted cross-sectional flow area, in order that substantially all of the solids are wetted and slurried into the liquid. In a specific case of fluid hydroforming as well as other processes in which a high boiling liquid product is produced, the quantity and temperature of quench oil are sufficient to condense substantially all of the high boiling normally liquid product in order that it can be used as the quench liquid.

The concentration of finely divided solid material entrained in the gaseous material varies widely, although it is usually in the density range which is commonly known as a lean phase. This density is about .1 to about 100 grains, more usually about .5 to about 15 grains per cubic foot of gaseous material. This concentration of entrained solids usually pertains to most fluid systems such as, for example, hydroforming, wherein a light hydrocarbon oil, e.g., gasoline, naphtha and/or kerosene, is contacted with a dense bed of finely divided reforming material under conditions suitable for producing a product of high anti-knock quality. The reforming process is conducted at a temperature of about 750° to about 1050° F., more usually, about 850° to about 950° F. The reaction is conducted under a pressure of about 25 to about 1000 p.s.i.g., more usually, about 50 to about 500 p.s.i.g. The total pressure of the reaction is maintained for the purpose of providing a hydrogen partial pressure which is advantageous for suppressing carbon or coke formation. It is customary to designate the hydrogen rate in terms of standard cubic feet (measured at 60° F. and 760 mm.) per barrel (1 barrel equal 42 gallons) of liquid feed. On this basis, the hydrogen supplied to the reforming zone can be from about 500 to about 20,000 s.c.f.b. more usually, about 1000 to 7500 s.c.f.b. The quantity of oil being processed relative to the quantity of catalyst which is present in the reaction zone is designated in terms of the weight space velocity which is measured as the pounds of oil feed on an hourly basis per pound of catalyst which is present in the reaction zone. The weight space velocity varies from about .05 to about 10, more usually, about 0.1 to about 2.5. The process can be operated as a fixed or moving bed system employing the fluid technique. In the moving bed system, the relative rate of catalyst being circulated to oil charge is measured on a weight basis, and generally, it can be about 0.05 to about 15, more usually, about .1 to about 2.0. Under the conditions specified above, there can be a net production or a net comsumption of hydrogen. More usually, the process is operated under such conditions that there is a net production of hydrogen, and there is no need for using an extraneous source of hydrogen to maintain the process.

The catalyst employed for reforming light hydrocarbon oils can be any one of those which is suitable for such a process, including, for example, those catalysts having aromatization properties or dehydrogenation-hydrogenation properties. Examples of suitable classes of catalyst which can be used for this purpose are compounds of metals in groups V and VI of the periodic table, more particularly, the oxides and/or sulfides of the left hand elements of groups V and VI of the periodic table. Another suitable class of catalyst is the noble metals of group VIII of the periodic table, such as platinum and palladium. The heteropoly acids including those having molybdenum, tungsten, vanadium and chromium can also be used for this purpose. Examples of the heteropoly acids are phosphomolybdic acid, silicomolybdic acid, aluminomolybdic acid, etc. The catalytic elements enumerated above can be used alone or supported on a carrier material, such as alumina of the gel or non-gel type, silica, silica-alumina, bauxite, zinc spinel, Superfiltrol, kieselguhr, pumice, etc. The catalytic element usually comprises about 0.01 to about 25% of the total catalyst.

In order to provide a better understanding of this invention, reference will be had to the accompanying drawing which illustrates a preferred embodiment thereof.

In the drawing, a naphtha feed having an API gravity of 54.3° is supplied through a line 5 at the rate of 30,000 b.p.s.d. The naphtha feed is transported by means of a pump 6, through a line 8, which leads to an absorption tower 10. The absorption tower is comprised of two sections; section A is the zone in which the gaseous material undergoing absorption treatment is contacted with the naphtha feed and section B is the zone in which the gaseous material leaving lower section A is contacted with the polymer product of the present process. Sections A and B are divided by means of a collecting pan 12 situated in the middle part of the tower 10. The naphtha feed flows downwardly over a series of trays situated within section A of the absorption tower 10, and thence it leaves the tower by means of a line 14 connected to the bottom thereof. The enriched naphtha feed is transported by means of a pump 15 and a line 16 for passage through a heat exchanger 17. In heat exchanger 17, the naphtha feed acquires heat at the rate of 21,400,000 B.t.u.'s per hour. The preheated naphtha feed having a temperature of about 225° F. flows from the heat exchanger 17 to a line 19, which divides such that equal quantities of enriched naphtha feed pass through lines 20 and 21 prior to entering heat exchangers 22 and 23, respectively. The naphtha feed leaves heat exchangers 22 and 23 by means of lines 24 and 25, respectively, at a temperature of about 400° F. The preheated naphtha enters a furnace 27 such that the naphtha flowing through line 24 is heated in a coil 29 located inside the furnace and the naphtha flowing through line 25 is heated in a coil 30 also located within furnace 27. The naphtha in a vaporized condition is discharged from furnace 27 by means of lines 32 and 33, and thence, the streams are combined to flow through a line 35.

The naphtha vapors are at a temperature of 1000° F. prior to entering a reforming zone (not shown), wherein the vapors are contacted with a mass of finely divided molybdenum trioxide on alumina catalyst containing 9% by weight of molybdenum trioxide, an average reaction temperature of 940° F., a reaction pressure of about 225 p.s.i.g., a catalyst to oil ratio of about 0.65, a weight space velocity of 0.35 and a hydrogen rate of about 2500 s.c.f.b. The product produced under the conditions just described is discharged from the reaction zone as two separate streams, each stream being produced at the rate of 250,283 pounds per hour having a molecular weight of 29.8 and containing 159 pounds per hour of entrained catalyst fines. The vaporous reaction product streams flow through lines 38 and 39, and thence, each stream passes through a series of heat exchangers in order that the heat contained by these product streams can be utilized for heating other processing streams. The vaporous reaction product flowing through line 39 passes through heat exchangers 41, 42, 43 and 44 consecutively; whereas the vaporous reaction product passing through line 38 flows through heat exchangers 46, 47, 48 and 49 consecutively. As a result of exchanging heat with other processing streams, the vaporous reaction product is reduced to a temperature of about 300° to about 500° F., e.g., 400° F. The divided streams of vaporous reaction product flow from heat exchangers 44 and 49 to lines 52 and 53, respectively, prior to being combined as a single stream in line 54.

In line 54, the vaporous reaction product is commingled or mixed with polymer material being supplied through line 56 at the rate of 39,000 b.p.s.d. This polymer product has an API gravity of 43° and contains approximately 2042 pounds of catalyst, on the same hourly rate. The polymer product is reduced to a temperature of 125° F. and by reason of the temperature and quantity of polymer product, substantially all of the vaporous polymer product is condensed and substantially all of the entrained catalyst fines are wetted. Since the operation is a simple quenching step, a portion of the gasoline product is also condensed and is mixed with the polymer product. The entire mixture of liquid, vapor and catalyst fines has a temperature of about 285° F. prior to entering a high pressure settler 57. At the point of entry of this mixture into high pressure settler 57, there is situated a baffle 58 for the purpose of preventing liquid entrainment in the vaporous upflowing materials. The upflowing vaporous material passes through two horizontal rows of chevron baffles 59, prior to being discharged from the high pressure settler 57 by means of a line 61. The condensed liquid and catalyst fines settle on collecting pan 62, and they stand on this pan, until they are withdrawn by means of a line 63, which is connected to the bottom thereof. The withdrawn liquid polymer and catalyst fines in line 63 are transported by means of pump 64 through a line 65. A portion of the liquid polymer laden with catalyst fines is passed from line 65 to line 66 which leads to a seperated bottom section C of settler 57 having a conical shaped bottom. The liquid polymer laden with catalyst fines is fed to section C at the rate of 6052 b.p.s.d., and it contains about 318 pounds of catalyst, on the same hourly basis. The remainder of the liquid polymer laden with catalyst fines is passed through a line 68 prior to flowing through a heat exchanger 17, wherein the heat contained in the liquid polymer is exchanged indirectly to the enriched naphtha feed flowing from the previously described absorption tower 10. The cooled liquid polymer is discharged from the heat exchanger 17, and then it flows through a line 70, prior to entering a cooler 71 in which the temperature of liquid polymer is further reduced from 195° F. to 125° F. The liquid polymer is discharged from cooler 71, and it flows into line 56 previously mentioned.

As a result of allowing the liquid polymer laden with catalyst fines to stand in section C of settler 57, the catalyst fines settle to the bottom part of the liquid, thus a supernatant liquid substantially free of fines is formed. The slurry of liquid polymer and fines is withdrawn from section C by means of a line 75 connected to the bottom thereof, and it is recycled to the reaction zone (not shown) at the rate of 132 b.p.s.d. containing 318 pounds per hour of catalyst. The supernatant liquid formed in section C of the high pressure settler 57 is discharged therefrom by means of a line 77. The pressure within section C of the high pressure settler is 275 p.s.i.g., hence, the supernatant liquid flowing through a pressure reducing valve 78 undergoes a reduction in pressure to about 10 p.s.i.g. The liquid polymer under reduced pressure flows through line 79 in which it is commingled with a gasoline enriched liquid polymer being supplied from a line 80. The combined streams flowing through line 79 thence enter a heat exchanger 82 wherein the temperature is raised to about 370° F., and then it is discharged from heat exchanger 82 into a line 83.

The gasoline enriched liquid polymer is fed to a stripping tower 85 which consists of an upper enlarged section D and a lower section E of reduced cross-sectional area. The upper section D of tower 85 serves as a fractionating means for the separation of a substantially pure stream of gasoline through an overhead line 87 of this section. The liquid polymer flows into the lower section D of the tower, and since it does contain gasoline, it is subjected to heating and stripping treatment by means of steam. In the bottom part of section E, there is situated a well 88 by means of which liquid polymer is withdrawn from the tower through a line 89. Steam is introduced from a source 90 at a pressure of 100 p.s.i.g. and at a rate of 3640 pounds per hour, and it is combined with the polymer flowing in line 89. The steam and liquid polymer flow through a heater 91 in which the temperature of the combined streams is raised to 455° F. prior to being returned to the bottom of section through a line 93, below the point of withdrawal of liquid polymer through line 89. The liquid polymer in the bottom of the stripper or section E exists at a temperature of 455° F. and under a total pressure of 10 p.s.i.g. As a result of heating and stripping the liquid polymer with steam, the gasoline components contained therein are vaporized and they pass along with the steam to the upper section D of tower 85.

The stripped polymer is withdrawn from the bottom of section E of tower 85 through a line 95, and part of it is transported by means of a pump 96, through a line 97, a cooler 98, and thence, it enters the top of section B of absorption tower 10 by means of a line 99. The net polymer production is withdrawn by means of line 258. By means of cooler 98, the temperature of the stripped liquid polymer is reduced to 95° F. The liquid polymer flows downwardly through section B of absorption tower 10 countercurrently to the rising stream of gaseous product material, and thereby, it absorbs any naphtha feed which has been vaporized into the normally gaseous material as a result of the previous absorption treatment. The enriched liquid polymer is withdrawn from section B by means of a line 80 which is connected to collecting pan 12. The gasoline enriched polymer flows through line 80 at the rate of 570 b.p.s.d., and it has an API gravity of 11.0° prior to being combined with the supernatant raw liquid polymer which is withdrawn from section D of the high pressure settler.

In section D of tower 85 polymer material is fractionated from the vaporous gasoline fraction flowing upwardly therethrough. The gasoline product is withdrawn from the top of this section by means of line 87, and it exists at a temperature of 320° F. Substantially all of the gasoline product and the steam mixed therewith are condensed in condenser 101, and thence, they flow by means of a line 102 to an accumulator 103. The steam condensate is withdrawn from accumulator 103 by means of a line 104 at the same rate as it is introduced in section E of the stripping tower. Normally gaseous material is removed from the top of the accumulator by means of a valved line 105, at the rate of 550 pounds per hour, and it has a molecular weight of 29.9. The temperature of the gasoline in acculator 103 is 95° F., and it exists therein at a pressure of 2 p.s.i.g. The liquid gasoline is withdrawn from accumulator 103 by means of a line 106, and thence, it is transported by means of a pump 107 into a second line 108. The liquid gasoline flowing through line 108 is divided so that 1570 b.p.s.d. flow through a line 109, and then it is refluxed to the top of section D of the stripping tower 85. The remaining portion of liquid gasoline flows through a line 110 at the rate of 5680 b.p.s.d., and it has an API gravity of 43.0°.

In high pressure settler 57, the uncondensed product material passes overhead through a line 61. The vaporous reaction product is then combined with the liquid gasoline flowing through line 110 and as a combined stream, it flows through a line 112 prior to entering a condenser 113. As a result of passing through the condenser substantially all of the gasoline product is condensed and the temperature is reduced to 95° F. The product comprised of normally gaseous material and gasoline is passed from the condenser 113 to an accumulator 115 by means of a line 116. Approximately 42.5 gallons per minute of water are withdrawn from the bottom of accumulator 115 by means of a valved line 118. The unstabilized gasoline product is withdrawn from the bottom of accumulator 115 by means of a line 119, and thence it is transported by means of a pump 120 through a line 121 prior to entering a heat exchanger 122. As a result of passing through heat exchanger 122, the unstabilized gasoline is raised in temperature to 350° F. and thence it flows from heat exchanger 122 to a line 123, prior to entering a second heat exchanger 124. The temperature of the unstabilized gasoline is raised to 400° F. as a result of passing through heat exchanger 124, and then it is discharged therefrom by means of a line 125 before being passed to the middle portion of a debutanizer column 126.

In the debutanizer column, the top temperature is maintained at 190° F. and the bottom temperature is maintained at 475° F., at a pressure of 210 p.s.i.g. The overhead product is removed from the debutanizer column through a line 128, and then it is passed through a condenser 129 wherein substantially all of the condensible hydrocarbons are liquefied and reduced to a temperature of about 100° F. The cooled overhead product passes from the condenser 129 to an accumulator 131 by means of a line 132. The liquefied product is removed from the bottom of the accumulator 131 by means of a line 134 at the rate of 16,580 b.p.s.d. This liquid product consists chiefly of $C_3$ and $C_4$ hydrocarbons. A portion of the liquid product passing through line 134 is recycled to column 126 by means of a line 135, pump 136 and line 137 at the rate of 13,250 b.p.s.d. The remainder of this liquid product is discharged from the system by means of a line 139, pump 140 and a product line 141. The normally gaseous material in accumulator 131 is discharged from the top thereof through a line 143. The debutanized gasoline is removed from the bottom of column 126 by means of a line 145. A portion of the debutanized gasoline being yielded from the bottom of column 126 by means of line 145 serves as a heat carrying medium for indirect exchange through a series of exchangers in the process. In the first instance, 40,000 b.p.s.d. of this debutanized gasoline at a temperature of 470° F. passes from line 145 to a line 147 prior to entering exchanger 124 which serves to preheat the unstabilized gasoline entering column 126. The stabilized gasoline is discharged from exchanger 124 by means of a line 148 at a temperature of 440° F. The cooled debutanized gasoline passes from line 148 to heat exchanger 82 wherein its temperature is reduced to 400° F. After leaving heat exchanger 82, the debutanized gasoline flows through a line 149, and thence, it is transported by means of pump 151 through a line 152, before it is divided such that equal portions pass through lines 153 and 154. The debutanized gasoline in lines 153 and 154 enter heat exchangers 47 and 42, respectively, wherein the temperature is raised to 525° F. by indirect exchange with vaporous reaction product entering the product recovery system under discussion. The heated debutanized gasoline streams flow from heat exchangers 47 and 42 by means of lines 156 and 157, respectively, and thence they are combined as a single stream in a line 159.

The debutanized gasoline flowing through line 159 is divided such that a portion first flows through a line 161, and thence it enters heat exchanger 91 wherein it serves to heat the mixture of steam and liquid polymer which are being fed to section E of stripper 85. The debutanized gasoline leaves the exchanger 91 and enters a line 163, which in turn, is connected to a line 164. The debutanized gasoline is passed through line 161 in the form of a liquid at the rate of 3900 b.p.s.d. and also in the form of a vapor at the rate of 70,000 pounds per hour. The liquid gasoline has an API gravity of 42.2° and the vapor has a molecular weight 103.0. The other portion of the debutanized gasoline passes from line 159 to line 166, such that it flows as a liquid at the rate of 5400 b.p.s.d. having an API gravity of 42.2° and as a vapor at the rate of 47,000 pounds per hour having a molecular weight of 103. The debutanized gasoline passes from line 166 to a heat exchanger 168, and thence, it is combined with the previously discussed debutanized portion of gasoline in line 164. The debutanized gasoline in line 163 has a temperature of 495° F. and then it is returned to the bottom part of debutanizer column 126.

23,000 b.p.s.d. of debutanized gasoline flowing through line 145 from tower 126 first passes through a line 250, and thence to heat exchanger 122 wherein the temperature is reduced to 195° F. This debutanized gasoline product is passed from heat exchanger 122 to a cooler 252 by means of a line 254. In the condenser 252, the temperature is reduced to 100° F. and the debutanized gasoline is discharged from the system through a line 256. The stripped liquid polymer is discharged from the system through line 258 at the rate of 150 b.p.s.d, and it has an API gravity of 11°. Line 258 is connected to line 99, previously described.

The normally gaseous product in accumulator 115 which is used in combination with high pressure settler 57 is discharged therefrom by means of a line 175. This normally gaseous product is discharged from the system by means of a line 177 at the rate of 6380 pounds per hour, and it has a molecular weight of 14.4. This normally gaseous product is combined with the normally gaseous material being discharged from the accumulator 131 of the debutanized column through line 143, and the combined streams flow through a line 179. The normally gaseous material flowing through line 179 enters the bottom of absorption tower 10, i.e. the bottom of section A thereof. Hydrocarbons of at least three carbon atoms are absorbed from the normally gaseous product stream flowing upwardly through absorption tower 10 and, hence, this material is discharged from the absorption tower through a line 181 at the rate of 45,690 pounds per hour having a molecular weight of 11.5. The denuded normally gaseous product material flowing from the accumulator 115 to line 175 has been divided in the manner described above, with the remaining portion being passed through line 183 at the rate of 122,496 pounds per hour. Initially, this gaseous product is passed to a drum 185 wherein any liquid material settles out and is discharged from the bottom thereof through a line 186. The normally gaseous product substantially free of liquid flows from drum 185 to a compressor 187 by means of a line 189. The compressed gaseous material is discharged from the compressor to a liquid drum 192 by means of a line 190 and any condensed material in drum 192 is removed therefrom by means of a valved bottom line 193. The normally gaseous material leaving the drum 192 at a temperature of 140° F. and a pressure of 295 p.s.i.g. is discharged into a line 195. This normally gaseous material contains about 55% hydrogen and, hence, it is used as recycle gas to the reforming zone. The recycle gas stream flowing through line 195 is divided such that equal portions pass to exchangers 41 and 46 by means of line 197 and 198, respectively. The recycle gas streams leave exchangers 41 and 46 by means of lines 199 and 200, respectively, at a temperature of 790° F. The recycle gas streams flowing through lines 199 and 200 enter coils 201 and 202, respectively, of furnace 27. The recycle gas streams having a temperature of 1200° F. are discharged from coils 201 and 202 to lines 204 and 205, respectively, and thence they combine as a single stream in a line 207 before being charged to the reforming zone (not shown).

Steam is generated in the system by the utilization of heat contained in the product streams. Accordingly, water is fed from a supply section 210, and it flows through heat exchanger 168, described in connection with the debutanized gasoline. As a result of heat exchange in exchanger 168, the water is raised in temperature to 330° F. and it is discharged therefrom to a steam drum 212 by means of a line 214. Water is discharged from the bottom of stream drum 212 through a line 215, and thence, this water stream divides such that equal portions are passed to heat exchangers 44 and 49 by means of lines 216 and 217, respectively. Steam is produced in the exchangers at a temperature of 344° F. The mixture of steam and water is discharged from exchangers 44 and 49 through lines 219 and 220, respectively, and thence they are combined as a single stream in line 221. The mixture of steam and water flowing in line 221 is fed to steam drum 212. Occasionally, liquid condensate is drained from drum 212 by means of a valved line 225. By the system illustrated, steam is generated at the rate of 50,600 pounds per hour.

We claim:
1. In a hydroforming process wherein a light hydrocarbon oil is contacted with a dense fluid bed of finely divided reforming catalyst under suitable reforming conditions in a reaction zone to produce a vaporous reaction product containing normally gaseous material, gasoline, polymer and entrained catalyst fines, the improvement which comprises condensing substantially all of the polymer and part of the gasoline components from the vaporous reaction product, wetting catalyst fines entrained in the reaction product by means of liquid polymer, separating liquid polymer from the catalyst fines, passing the separated liquid polymer to a stripping zone wherein gasoline components are separated therefrom, separating the normally gaseous product from the gasoline such that part of the gasoline components remain in the gaseous material, contacting the separated normally gaseous product with light hydrocarbon oil liquid feed in a first absorption zone to absorb therefrom gasoline components, and contacting the gaseous product from the absorption zone with liquid polymer in a second absorption zone to absorb therefrom any normally liquid material contained therein.

2. The process of claim 1 wherein the reforming catalyst comprises molybdenum oxide.

3. In a hydroforming process wherein a light hydrocarbon oil is contacted with a dense fluid bed of finely divided reforming catalyst under suitable reforming conditions in a reaction zone to produce a vaporous reaction product containing normally gaseous material, gasoline, polymer and entrained catalyst fines, the improvement which comprises condensing substantially all of the polymer and part of the gasoline components from the vaporous reaction product, wetting catalyst fines entrained in the reaction product by means of liquid polymer, separating liquid polymer from the catalyst fines and passing the same to a stripping zone wherein it is contacted with steam at an elevated temperature in order to separate the gasoline components therefrom as a vapor in the stripping steam, cooling the stripping steam laden with gasoline components to effect substantial condensation thereof, separating the condensed gasoline from the water, separating the normally gaseous material from the gasoline such that part of the gasoline components remain in the gaseous material, contacting the separated normally gaseous material with light hydrocarbon oil liquid feed in a first absorption zone to absorb therefrom gasoline components, and contacting the gaseous product from the absorption zone with liquid polymer in a second absorption zone to absorb therefrom any normally liquid material contained therein.

4. In a hydroforming process wherein a light hydrocarbon oil is contacted with a dense fluid bed of finely divided reforming catalyst under suitable reforming conditions in a reaction zone to produce a vaporous reaction product containing normally gaseous material, gasoline, polymer and entrained catalyst fines, the improvement which comprises condensing substantially all of the polymer and part of the gasoline components from the vaporous reaction product, wetting catalyst fines entrained in the reaction product by means of liquid polymer, separating liquid polymer from the catalyst fines, passing the separated liquid polymer to a stripping zone wherein gasoline components are separated therefrom, separating the normally gaseous product from the gasoline such that part of the gasoline components remain in the gaseous material, contacting the separated normally gaseous product with light hydrocarbon oil liquid feed in a first absorption zone to absorb therefrom gasoline components, contacting the gaseous product from the absorption zone with liquid polymer in a second absorption zone to absorb therefrom any normally liquid material contained therein, and passing the liquid polymer from the second absorption zone to the stripping zone.

5. In a hydroforming process wherein a light hydrocarbon oil is contacted with a dense fluid bed of finely divided reforming catalyst under suitable reforming conditions in a reaction zone to produce a vaporous reaction product containing normally gaseous material, gasoline, polymer and entrained catalyst fines, the improvement which comprises condensing substantially all of the polymer and part of the gasoline components from the vaporous reaction product, wetting catalyst fines entrained in the reaction product by means of liquid polymer, separating liquid polymer from the catalyst fines and passing the same to a stripping zone wherein it is contacted with steam at an elevated temperature in order to separate the gasoline components therefrom as a vapor in the stripping steam, cooling the stripping steam laden with gasoline components to effect substantial condensation thereof, separating the condensed gasoline from the water, separating the normally gaseous material from the gasoline such that part of the gasoline components remain in the gaseous material, contacting the separated normally gaseous material with light hydrocarbon oil liquid feed in a first absorption zone to absorb therefrom gasoline components, contacting the gaseous product from the absorption zone with liquid polymer in a second absorption zone to absorb therefrom any normally liquid material contained therein, and passing the liquid polymer from the second absorption zone to the stripping zone.

6. In a hydroforming process wherein a light hydrocarbon oil is contacted with a dense fluid bed of finely divided reforming catalyst under suitable reforming conditions in a reaction zone to produce a vaporous reaction product containing normally gaseous material, gasoline, polymer and entrained catalyst fines, the improvement which comprises passing the vaporous reaction product in a transfer zone wherein it is contacted with liquid polymer in a quantity sufficient to provide a linear flow velocity of about 30 to about 500 feet per second therein and thereby wetting substantially all of the catalyst fines and condensing substantially all of the polymer and part of the gasoline components contained in the vaporous product, passing liquid polymer to the transfer zone, separating liquid polymer from the catalyst fines, passing the separated liquid polymer to a stripping zone wherein gasoline components are separated therefrom, separating the normally gaseous product from the gasoline such that part of the gasoline components remain in the gaseous material, contacting the separated normally gaseous product with light hydrocarbon oil liquid feed in a first absorption zone to absorb therefrom gasoline components, and contacting the gaseous product from the absorption zone with liquid polymer in a second absorption zone to absorb therefrom any normally liquid material contained therein.

7. In a hydroforming process wherein a light hydrocarbon oil is contacted with a dense fluid bed of finely divided reforming catalyst under suitable reforming conditions in a reaction zone to produce a vaporous reaction product containing normally gaseous material, gasoline, polymer and entrained catalyst fines, the improvement which comprises cooling the total reaction product to a temperature of about 300° to about 500° F., passing the cooled vaporous reaction product in a transfer zone wherein it is contacted with liquid polymer in a quantity sufficient to provide a linear flow velocity of about 30 to about 500 feet per second therein and thereby wetting substantially all of the catalyst fines and condensing substantially all of the polymer and part of the gasoline components contained in the vaporous product, separating a portion of the condensed liquid polymer and recycling the same to the transfer zone, separating liquid polymer from the catalyst fines, passing the separated liquid polymer to a stripping zone wherein gasoline components are separated therefrom, separating the normally gaseous product from the gasoline such that part of the gasoline components remain in the gaseous material, contacting the separated normally gaseous product with light hydrocarbon oil liquid feed in a first absorption zone to absorb therefrom gasoline components, and contacting the gaseous product from the absorption zone with liquid polymer in a second absorption zone to absorb therefrom any normally liquid material contained therein.

8. In a hydroforming process wherein a naphtha fraction is contacted with a dense fluid bed of finely divided reforming catalyst under suitable reforming conditions in a reaction zone to produce a vaporous reaction product containing normally gaseous material, gasoline, polymer and entrained catalyst fines, the improvement which comprises cooling the total vaporous product to a temperature of about 300° to about 500° F., passing the cooled vaporous reaction product to a transfer zone wherein it is contacted with liquid polymer in a quantity sufficient to provide a linear flow velocity of about 30 to about 500 feet per second and thereby wetting substantially all the catalyst fines and condensing substantially all of the polymer and part of the gasoline components contained in the vaporous reaction product, separating a portion of the condensed liquid polymer and recycling the same to the transfer zone in the aforesaid quantity, separating liquid polymer from the catalyst fines, passing the separated liquid polymer to a stripping zone wherein it is contacted with steam at an elevated temperature to strip therefrom gasoline components as a vapor in the steam, cooling the gasoline enriched steam to condense substantially all of the gasoline, separating the condensed gasoline from the water, separating the normally gaseous material from the gasoline product such that part of the gasoline components remain in the gaseous material, contacting the separated normally gaseous material with liquid naphtha feed in a first absorption zone to absorb therefrom gasoline components, contacting the gaseous product from the absorption zone with liquid polymer from the stripping zone in a second absorption zone to absorb therefrom any normally liquid material contained therein, and passing the liquid polymer from the second absorption zone to the stripping zone.

9. The process of claim 8 wherein the reforming catalyst comprises molybdenum oxide.

10. The process of claim 6 wherein the linear flow velocity in the transfer zone is about 60 to about 150 feet per second.

11. The process of claim 7 wherein the linear flow velocity in the transfer zone is about 60 to about 150 feet per second.

12. The process of claim 8 wherein the linear flow velocity in the transfer zone is about 60 to about 150 feet per second.

13. In a hydroforming process wherein a light hydrocarbon oil is contacted with a dense fluid bed of finely divided reforming catalyst under suitable reforming conditions in a reaction zone to produce a vaporous reaction product containing normally gaseous material, gasoline, polymer and entrained catalyst fines, the improvement which comprises cooling the total reaction product indirectly with water to produce steam and thereby condensing substantially all of the polymer and part of the gasoline components from the vaporous reaction product, wetting catalyst fines entrained in the reaction product by means of liquid polymer, separating liquid polymer from the catalyst fines and passing the same to a stripping zone wherein it is contacted with steam produced in the aforesaid manner at an elevated temperature in order to separate the gasoline components therefrom, separating the normally gaseous material from the gasoline product such that part of the gasoline components remain in the gaseous material, contacting the separated normally gaseous material with light hydrocarbon oil liquid feed in a first absorption zone to absorb therefrom gasoline components, and contacting the gaseous product from the absorption zone with liquid polymer in a second absorption zone to absorb any normally liquid material contained therein.

14. The process of claim 7 wherein it is further characterized by cooling the total reaction product indirectly with water to produce steam and the steam thus produced is passed to the stripping zone wherein it serves to strip gasoline components from the liquid polymer.

15. In a hydrocarbon conversion process wherein a light hydrocarbon oil is contacted with a dense fluid bed of finely divided catalyst in a reaction zone to produce a vaporous reaction product containing normally gaseous material, gasoline, polymer and entrained catalyst fines, the improvement which comprises condensing substantially all of the polymer and part of the gasoline components from the vaporous reaction product, wetting catalyst fines entrained in the reaction product by means of liquid polymer, separating liquid polymer from the catalyst fines, passing the separated liquid polymer to a stripping zone wherein gasoline components are separated therefrom, separating the normally gaseous product from the gasoline such that part of the gasoline components remain in the gaseous material, contacting the separated normally gaseous product with light hydrocarbon oil liquid feed in a first absorption zone to absorb therefrom gasoline components, and contacting the gaseous product from the absorption zone with liquid polymer in a second absorption zone to absorb therefrom any normally liquid material contained therein.

16. In a hydrocarbon conversion process wherein a light hydrocarbon oil is contacted with a dense fluid bed of finely divided catalyst in a reaction zone to produce a vaporous reaction product containing normally gaseous material, gasoline, polymer and entrained catalyst fines, the improvement which comprises condensing substantially all of the polymer and part of the gasoline components from the vaporous reaction product, wetting catalyst fines entrained in the reaction product by means of liquid polymer, separating liquid polymer from the catalyst fines and passing the same to a stripping zone wherein it is contacted with steam at an elevated temperature in order to separate the gasoline components therefrom as a vapor in the stripping steam, cooling the stripping steam laden with gasoline components to effect substantial condensation thereof, separating the condensed gasoline from the water, separating the normally gaseous material from the gasoline such that part of the gasoline components remain in the gaseous material, contacting the separated normally gaseous material with light hydrocarbon oil liquid feed in a first absorption zone to obsorb therefrom gasoline components, and contacting the gaseous product from the absorption zone with liquid polymer in a second absorption zone to absorb therefrom any normally liquid material contained therein.

17. In a hydrocarbon conversion process wherein a light hydrocarbon oil is contacted with a dense fluid bed of finely divided reforming catalyst under suitable reforming conditions in a reaction zone to produce a vaporous reaction product containing normally gaseous material, gasoline, polymer and entrained catalyst fines, the improvement which comprises condensing substantially all of the polymer and part of the gasoline components from the vaporous reaction product, wetting catalyst fines entrained in the reaction product by means of liquid polymer, separating liquid polymer from the catalyst fines, passing the separated liquid polymer to a stripping zone wherein gasoline components are separated therefrom, separating the normally gaseous product from the gasoline such that part of the gasoline components remain in the gaseous material, contacting the separated normally gaseous product with light hydrocarbon oil liquid feed in a first absorption zone to absorb therefrom gasoline components, contacting the gaseous product from the absorption zone with liquid polymer in a second absorption zone to absorb therefrom any normally liquid material contained therein, and passing the liquid polymer from the second absorption zone to the stripping zone.

References Cited in the file of this patent

UNITED STATES PATENTS

| | | |
|---|---|---|
| 2,414,883 | Martin | Jan. 28, 1947 |
| 2,663,676 | Cardwell et al. | Dec. 22, 1953 |
| 2,665,239 | Howard et al. | Jan. 5, 1954 |
| 2,797,189 | Virgil | June 25, 1957 |